United States Patent [19]

Deller et al.

[11] Patent Number: 5,858,906
[45] Date of Patent: Jan. 12, 1999

[54] COMPACTS BASED ON PYROGENICALLY PRODUCED OXIDES

[75] Inventors: Klaus Deller, Hainburg; Helmfried Krause, Rodenbach; Roland Burmeister, Geiselbach, all of Germany

[73] Assignee: Degussa Aktiengesellschaft, Frankfurt am Main, Germany

[21] Appl. No.: 510,033

[22] Filed: Aug. 1, 1995

[30] Foreign Application Priority Data

Aug. 4, 1994 [DE] Germany .......................... 44 27 574.9

[51] Int. Cl.⁶ ........................... B01J 31/00; C04B 35/14; C01B 33/12
[52] U.S. Cl. ........................... 502/170; 502/242; 502/251; 502/300; 502/263; 502/350; 502/232; 502/63; 502/509; 501/133; 501/154; 423/335; 423/337; 106/481; 106/482
[58] Field of Search ....................................... 502/170, 242, 502/251, 300, 263, 350, 232, 63, 509; 501/133, 154; 423/335, 337; 106/481, 482

[56] References Cited

U.S. PATENT DOCUMENTS

| | | | |
|---|---|---|---|
| 3,717,486 | 2/1973 | Fukumoto et al. | 501/154 |
| 4,126,422 | 11/1978 | Brandes | 501/133 |
| 4,221,596 | 9/1980 | Rice | 501/133 |
| 4,297,143 | 10/1981 | Kleinschmit et al. | 501/103 |
| 4,482,642 | 11/1984 | Ettinger et al. | 502/232 |
| 4,737,306 | 4/1988 | Wichelhaus et al. | 423/328.2 |
| 5,002,917 | 3/1991 | Deller et al. | 502/242 |
| 5,021,378 | 6/1991 | Deller et al. | 502/62 |
| 5,053,362 | 10/1991 | Chi et al. | 501/133 |
| 5,086,031 | 2/1992 | Deller et al. | 502/251 |
| 5,231,067 | 7/1993 | Deller et al. | 502/350 |
| 5,366,938 | 11/1994 | Deller et al. | 502/134 |
| 5,380,687 | 1/1995 | Mangold et al. | 502/128 |
| 5,424,258 | 6/1995 | Mangold et al. | 502/128 |
| 5,609,675 | 3/1997 | Noritake et al. | 501/133 |
| 5,610,116 | 3/1997 | Werdecker et al. | 502/263 |

FOREIGN PATENT DOCUMENTS

| | | | |
|---|---|---|---|
| 327722 | 12/1988 | European Pat. Off. | C04B 35/14 |
| 393356 | 3/1990 | European Pat. Off. | B01J 21/08 |
| 26 25 705 | 12/1976 | Germany | B01J 21/08 |
| 32 17 751 | 11/1983 | Germany | C08B 35/46 |
| 39 12 504 | 10/1990 | Germany | C08B 33/12 |

*Primary Examiner*—Deborah Jones
*Assistant Examiner*—Patricia L. Hailey
*Attorney, Agent, or Firm*—Beveridge, DeGrandi, Weilacher & Young, LLP

[57] ABSTRACT

Compacts produced from a pyrogenically produced oxide, magnesium stearate, methyl cellulose and urea are mixed together in the presence of water, compacted, dried, comminuted to a powder, and the powder is pressed with an isostatic press to compacts and the compacts tempered. The resulting compacts have an outside diameter of 16 to 100 mm.

19 Claims, No Drawings

COMPACTS BASED ON PYROGENICALLY PRODUCED OXIDES

INTRODUCTION AND BACKGROUND

The present invention relates to compacts made from pyrogenically produced oxides, the method of their production and to the use of such compacts as catalyst supports or as catalysts.

The production of compacts or pressed parts from pyrogenically produced silicon dioxide is known in the art. For example, In U.S. Pat. No. 5,086,031 compacts are described having an outside diameter of 2 to 15 mm and a fracture breaking strength of 50 to 150 N. They can be used as catalysts in the hydration of ethylene to ethanol as well as other reactions. U.S. Pat. No. 5,086,031 assigned to the same assignee as this invention is relied on and incorporated herein by reference.

However, the known compacts have the disadvantage that when they are used e.g. as catalysts in the hydration of ethylene in fixed-bed reactors, additional support-, covering- or facing layers, e.g. of coal, metals such as copper, ceramic materials or mineral materials such as mullite must be used (cf. Marshall Sittig, Handbook of Catalyst Manufacture, Noyes Data Corporation, USA, 1978).

As a result of the different chemical composition of the support-, covering- or facing layers, impurities, which can possibly result in undesired side reactions, are carried into the reaction mixture.

There was thus a need to find a material for the support-, covering- or facing layers which does not carry any impurities into the reaction mixture.

SUMMARY OF THE INVENTION

It is therefore an object of the present invention to manufacture silica compacts in such a way as to avoid introducing impurities which would deleteriously interfere with the ethylene hydration reactions.

In achieving the above and other objects, one feature of the present invention resides in catalyst compacts having the following properties:

The fracture strength is 1.5 to 12.0 KN.

The density is from 0.5 to 2.2 g/cm$^3$.

The pore volume is from 0.0 to 1.5 ml/g.

Titanium dioxide, aluminum oxide and/or silicon dioxide and mixtures thereof can be used as pyrogenically produced oxide to make the catalyst compacts, also called pressed parts.

In a preferred embodiment silicon dioxides with the following physicochemical characteristic data can be used as the pyrogenically produced silicon dioxide:

|  | Aerosil 90 | Aerosil 130 | Aerosil 150 | Aerosil 200 | Aerosil 300 | Aerosil 380 |
|---|---|---|---|---|---|---|
| Surface according to BET, m$^2$/g | 90 ± 15 | 130 ± 25 | 150 ± 15 | 200 ± 25 | 300 ± 30 | 380 ± 30 |
| Average size of the primary particles, nm | 20 | 16 | 14 | 12 | 7 | 7 |
| stamping density[1], g/l | ca. 80 | ca. 50 | ca. 50 | ca. 50 | ca. 50 | ca. 50 |
| Drying loss[2], (2 hours at 105° C., % | <1 | <1.5 | <0.5[7] | <1.5 | <1.5 | <1.5 |
| Annealing loss[2)5] (2 hours at 1000° C., % | <1 | <1 | <1 | <1 | <2 | <2.5 |
| pH[3] (in 4% aqueous dispersion | 3.6–4.5 | 3.6–4.3 | 3.6–4.3 | 3.6–4.3 | 3.6–4.3 | 3.6–4.3 |
| SiO$_2$[6], % | >99.8 | >99.8 | >99.8 | >99.8 | >99.8 | >99.8 |
| Al$_2$O$_3$[6], % | <0.05 | <0.05 | <0.05 | <0.05 | <0.05 | <0.05 |
| Fe$_2$O$_3$[6], % | <0.003 | <0.003 | <0.003 | <0.003 | <0.003 | <0.003 |
| TiO$_2$O[6], % | <0.03 | <0.03 | <0.03 | <0.03 | <0.03 | <0.03 |
| HCl[6)8],% | <0.025 | <0.025 | <0.025 | <0.025 | <0.025 | <0.025 |
| Sieve residue[4] (according to Mocker, 45 μm), % | <0.05 | <0.05 | <0.05 | <0.05 | <.0.05 | <0.05 |

[1]according to DIN 53 194
[2]according to DIN 55 921
[3]according to DIN 53 200
[4]according to DIN 580
[5]relative to the substance dried 2 hours at 105° C.
[6]relative to the substance annealed 2 hours at 1000° C.
[8]HCL content is a component of the annealing loss AEROSIL® is a registered trademark of Degussa AG.

In achieving the above and other objects, one feature of the invention resides in the compacts made from pyrogenically produced oxides, such as silica, which have an outside diameter of 16 to 100 mm, preferably 20 to 70 mm. The compacts can be in tablet form or spherical form although spherical form is preferred.

In another feature of the invention the compacts are produced by mixing together a pyrogenically produced oxide, and additives such as magnesium stearate, methyl cellulose and urea in the presence of water. The mixture is compacted and pressed together and dried and then comminuted to a powder. The powder is then gathered and pressed. It has been found that particularly good results are obtained if the pressing is carried out with an isostatic press at a pressure of 25 to 650 bar. As an alternative, the powder can be pressed by means of an axial press with a pressing force of 1 to 50 tons. The compacts are then tempered at a temperature graduated in time in the range extending from room temperature to 1200° C.

Still a further feature of the present invention resides in using the compacts of this invention as a support layer for other catalysts in a fixed bed catalytic reactor for such reactions as the hydration of ethylene to form ethanol. In that embodiment another catalysts such as that of U.S. Pat. No. 5,086,031 can be used as the top layer which is layered on top of the support layer.

DETAILED DESCRIPTION OF THE INVENTION

In order to produce a pyrogenically produced oxide, such as silica of the brand known as AEROSIL®, a volatile silicon compound is sprayed into an oxyhydrogen flame of hydrogen and air. In most instances silicon tetrachloride is used. This substance hydrolyzes under the influence of the water produced during the hydrogen-oxygen reaction to silicon dioxide and hydrochloric acid. After leaving the flame, the silicon dioxide enters into a so-called coagulation zone in which the silica primary particles and silica primary aggregates agglomerate. The product present in this stage is a type of aerosol and is then separated in a cyclone from the gaseous accompanying substances and subsequently treated with moist hot air. The residual hydrochloric acid content can be lowered below 0.025 % by this method. Since the silica accumulates at the end of this process with a bulk density of only approximately 15 g/l a vacuum compacting step is typically added. In this compression step, stamping densities of approximately 50 g/l and more can be used. AEROSIL 200 is a preferred pyrogenically produced silicon dioxide.

The compacts of the invention can be produced by a method in which a pyrogenically produced oxide such as silica, and the other ingredients; namely, at least one member of the group consisting of magnesium stearate, methyl cellulose and urea are mixed together in the presence of water. The resulting mixture is then compacted and dried. Thereafter, the dried compact is comminuted to a powder. By pressing the powder so produced with an isostatic press at a pressure of 25 to 650 bar, preferably 570 to 610 bar, or by means of an axial press with a pressing force of 1 to 50 tons the compacts of the invention can be formed. The compacts so produced are then tempered at temperatures graduated in time in a range extending from room temperature to 1200° C.

The tempering, which is carried out at temperatures graduated in time, can consist of the following phases:

Heating for 60±10 min at 200±20° C.,
Heating for 120±10 min at 400±20° C.,
Heating for 120±10 min at 900±20° C.,
Maintaining for 360±10 min at 400±20° C.,
Cooling to room temperature, if necessary
Heating for 120±10 min at 1000±20° C.,
Maintaining for 240±10 min at 1000±20° C.,
Cooling to room temperature.

The components of the initial mixture can be mixed with each other in the following amount ratios, relative to the total mixture (equal to 100%):

| | |
|---|---|
| Pyrogenically produced oxide | 45 to 88% (by weight) |
| Magnesium stearate | 5 to 15% |
| Methyl cellulose | 5 to 20% |
| Urea | 2 to 10% |
| Water | 0 to 10%. |

The compacts of the invention advantageously have a high chemical purity on account of the pyrogenic origin of the oxide used. This quality is particularly advantageous when the compacts of the invention are used during the catalytic hydration of ethylene to ethanol in a fixed-bed reactor as a covering-, support or facing layer. The contamination of the catalyst with impurities of the material of the support-, covering- or facing layer is excluded by the high chemical purity of the compacts of the present invention. Side reactions which adversely affect the intended catalytic reaction do not occur when the compacts of the invention are used.

The compacts of the invention exhibit a high fracture strength and compressive strength of up to approximately 1 ton, a low wear and a high elasticity. These qualities are especially significant during the filling of the fixed-bed reactor and during the mechanical loading of the formed body while the reaction is being carried out.

The compacts of the invention have a pore volume of up to 1.5 ml/g and no micropores smaller than 3 nm. The pore sizes are, measured according to DIN 66 133, between 5 and 25 nm with a distinct maximum at 18 nm. They therefore resemble the compacts according to DE 39 12 504. This means that if compacts according to DE 39 12 504 are used as catalysts, the compacts of the invention can be used as a support layer. The compacts when so used make a catalytic contribution to the intended fixed-bed reaction, e.g. to the catalytic hydration of ethylene to ethanol.

EXAMPLES

Example 1

77.2% pyrogenically produced silica (Aerosil®) 200,
17.3% magnesium stearate,
11.6% methyl cellulose,
3.9% urea are compacted under the addition of water, dried 24 hours at 100° C., comminuted to a flowable powder and pressed on an isostatic ball press at a pressure of approximately 600 bar to spheres of approximately 57 mm in diameter.

These raw spheres are then calcined in air with the following temperature profile:

1. Heat in 60 min to 200° C., then
2. Heat in 120 min to 400° C., then
3. Heat in 120 min to 900° C., then
4. Maintain 360 min 900° C., then
5. Cool off to room temperature.

The physical property data of the compacts obtained thereby is set forth in table I.

Example 2

The process is carried out as in example 1, but subsequently (after step 5) the following heat treatment schedule is observed:

6. Heat in 120 min to 1000° C.,

7. Maintain 240 min at 1000° C., then

8. Cool off to room temperature.

The physical property data of the compacts obtained thereby is set forth in table I.

|  | Example 1 | Example 2 | Example 3 |
| --- | --- | --- | --- |
| Diameter mm | 56 | 45 | 20 × 40 |
| Weight g | 58 | 57 | 23 |
| Density g/cm³ | 0.75 | 1.20 | 0.90 |
| Pore volume ml/g | 0.90 | 0.35 | 0.60 |
| Fracture strength[1] KN | 1.63–3.10 (10 spheres) | 6.60–10.59 (5 spheres) |  |
| Average fracture strength[1] KN | 2.39 | 8.21 | 2.27 |
| Wear[2] | 5.4% | 1.6% |  |

[1]The fracture strength is determined according to ASTM D 4179-82.
[2]The determination of the wear takes place in an apparatus according to ASTM D 4058-81 using 3 compacts, test time 30 min at 60 rpm.

Example 3

The raw deformation powder prepared according to example 1 is subjected to compacting, drying and comminution to form a flowable powder. This is then subjected to an axial press using cylindrical matrices with a diameter of 40 mm and a pressing force of 150 KN to form shaped tablets 40 mm in diameter and 20 mm in height. The tablets are calcined in air with the following temperature schedule:

1. Heat in 60 min to 200° C., then

2. Heat in 120 min to 400° C., then

3. Heat in 120 min to 900° C., then

4. Maintain 360 min at 900° C., then

5. Cool off to room temperature.

The substance data of the compacts obtained is cited in table I.

Further variations and modifications of the foregoing will be apparent to those skilled in the art and are intended to be encompassed by the claims appended hereto.

German priority document P 44 27 574.9 is relied and incorporated herein by reference.

We claim:

1. A shaped compact comprising a pyrogenically produced oxide having an outside diameter of 16 to 100 mm and a fracture strength of 1.5 to 12 KN.

2. The compact according to claim 1 further comprising pyrogenically produced silica, magnesium stearate, methyl cellulose and urea.

3. The compact according to claim 1 formed from the following mixture:

pyrogenically produced oxide 45 to 88%, magnesium stearate 5 to 15%, methyl cellulose 5 to 20%, urea 2 to 10%, water 0–10%.

4. The compact according to claim 3 having the following composition on a dry basis:

77.2% pyrogenically produced silica 7.3% magnesium stearate 11.6% methyl cellulose 3.9% urea.

5. The compact according to claim 1 which is a tablet or a sphere.

6. The compact according to claim 1 which has a density of 0.5 to 2.2 g/cm³ and a pore volume of 0 to 1.5 ml/g.

7. The compact according to claim 1 wherein the pyrogenically produced oxide is a member selected from the group consisting of titanium dioxide, aluminum oxide, silicon dioxide and mixtures thereof.

8. A catalyst which is a shaped compact of pyrogenically produced oxides having an outside diameter of 16 to 100 mm and a fracture strength of 1.5 to 12 KN.

9. The catalyst according to claim 8 comprising pyrogenically produced oxide, magnesium stearate, methyl cellulose and urea.

10. The catalyst according to claim 8 wherein the following ingredients are present:

| pyrogenically produced oxide | 45 to 88% |
| --- | --- |
| magnesium stearate | 5 to 15% |
| methyl Cellulose | 5 to 20% |
| urea | 2 to 10%. |

11. The catalyst according to claim 8 having the following composition in percent by weight:

77.2% pyrogenically produced silica 7.3% magnesium stearate 11.6% methyl cellulose 3.9% urea.

12. The catalyst according to claim 8 which is a tablet or a sphere.

13. The catalyst according to claim 8 which has the following physical properties:

| density | 0.5 to 2.2 g/cm³ |
| --- | --- |
| pore volume | 0 to 1.5 ml/g. |

14. The catalyst according to claim 8 wherein the pyrogenically produced oxide is a member selected from the group consisting of titanium dioxide, aluminum oxide, silicon dioxide and mixtures thereof.

15. A method of making a compact suitable for use as a catalyst comprising:

mixing a pyrogenically produced oxide with at least one member selected from the group consisting of magnesium stearate, methyl cellulose, and urea, adding water and compacting the mixture resulting therefrom to form a compacted mixture, drying said compacted mixture, comminuting said compacted mixture to a powder, pressing said powder with an isostatic press at a pressure of 25 to 650 bar, or pressing with an axial press having a force of 1 to 50 tons to form a compact, and tempering said compact at a temperature ranging from room temperature to 1200° C. for 11–17 hours.

16. The method according to claim 15 wherein the pyrogenically produced oxide is a member selected from the group consisting of titanium dioxide, aluminum oxide, silicon dioxide and mixtures thereof.

17. The method according to claim 15 wherein the tempering is carried with the following heat schedule:

heating for 60±10 min at 200±20° C., heating for 120±10 min at 400±20° C., heating for 120±10 min at 900±20° C., maintaining for 36±10 min at 400±20° C., cooling to room temperature, if necessary, heating for 120±10 min at 1000±20° C., maintaining for 240±10 min at 1000±20° C., and cooling to room temperature.

18. A compact based pyrogenically produced oxide produced by a method comprising a pyrogenically produced of oxide, and a member selected from the group consisting of magnesium stearate, methyl cellulose, urea and mixtures thereof in the presence of water, to form a mixture, compacting said mixture to form a compacted mixture, drying said compacted mixture to form a dried mixture, comminuting said dried mixture to form a powder and pressing the powder with an isostatic press at a pressure of 25 to 650 bar, or pressing by means of an axial press with a pressing force of 1 to 50 tons to form a compact, and tempering said compact formed thereby at a temperature graduated in time in a range extending from room temperature to 1200° C. or 11–17 hours.

19. A spherically shaped compact comprising a pyrogenically produced oxide having an outside diameter of 16 to 100 mm and a fracture strength of 1.5 to 12 KN.

* * * * *